US012756981B2

(12) United States Patent
Ren et al.

(10) Patent No.: US 12,756,981 B2
(45) Date of Patent: Oct. 6, 2026

(54) SOUND DEVICE

(71) Applicant: AAC Microtech (Changzhou) Co., Ltd., Changzhou (CN)

(72) Inventors: Li Ren, Changzhou (CN); Chao Zhang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 388 days.

(21) Appl. No.: 18/337,413

(22) Filed: Jun. 19, 2023

(65) Prior Publication Data

US 2024/0214741 A1 Jun. 27, 2024

Related U.S. Application Data

(63) Continuation of application No. PCT/CN2023/072812, filed on Jan. 18, 2023.

(30) Foreign Application Priority Data

Dec. 22, 2022 (CN) ........................ 202223467333.4

(51) Int. Cl.

| | |
|---|---|
| ***H04R 9/02*** | (2006.01) |
| ***H04R 7/04*** | (2006.01) |
| ***H04R 7/18*** | (2006.01) |
| ***H04R 9/04*** | (2006.01) |
| ***H04R 9/06*** | (2006.01) |

(52) U.S. Cl.

CPC ............... *H04R 9/025* (2013.01); *H04R 7/04* (2013.01); *H04R 7/18* (2013.01); *H04R 9/045* (2013.01); *H04R 9/063* (2013.01); *H04R 2400/11* (2013.01)

(58) Field of Classification Search

None

See application file for complete search history.

(56) References Cited

U.S. PATENT DOCUMENTS

| | | | | |
|---|---|---|---|---|
| 2016/0021441 A1* | 1/2016 | Shao | H04R 1/24 | 381/412 |
| 2021/0227331 A1* | 7/2021 | Oclee-Brown | H04R 9/063 | |
| 2023/0217179 A1* | 7/2023 | Liu | H04R 9/025 | 381/345 |
| 2024/0089666 A1* | 3/2024 | Lee | H04R 9/063 | |
| 2025/0008269 A1* | 1/2025 | Zhang | H04R 9/045 | |

* cited by examiner

*Primary Examiner* — Walter F Briney, III

(74) *Attorney, Agent, or Firm* — Wiersch Law Group

(57) ABSTRACT

A sound device includes: a frame, a first vibration system, a magnetic circuit system, and a second vibration system. The magnetic circuit system includes a first magnetic conductive plate, a main magnetic steel, first side magnetic steels, second side magnetic steels, and second magnetic conductive plates. The first magnetic conductive plate includes a magnetic conductive plate body, side plates, and fixing plats. The main magnetic steel, the first side magnetic steels, and the side plates are enclosed to define a first magnetic gap. The second magnetic conductive plates are disposed around the magnetic conductive plate body at intervals and the second magnetic conductive plates are enclosed to define a second magnetic gap. A first voice coil is inserted into the first magnetic gap. A second voice coil is inserted into the second magnetic gap. Compared with the prior art, the sound device improves acoustic performance.

9 Claims, 8 Drawing Sheets

100

SOUND DEVICE

TECHNICAL FIELD

The present disclosure relates to a field of electroacoustic conversion, and in particular to a sound device applied to portable electronic products.

BACKGROUND

Sound devices are configured as one of main components of mobile terminals such as mobile phones, which are mainly configured to convert electric signals into sound signals.

A sound device in prior art includes a frame, a vibration system, and a magnetic circuit system. The vibration system is fixed to the frame. The magnetic circuit system defines a magnetic gap. The vibration system includes a vibrating diaphragm and a voice coil. The vibrating diaphragm is fixed to the frame and is configured to vibrate and sound. The voice coil is inserted into the magnetic gap to drive the vibrating diaphragm to vibrate. The magnetic circuit system includes a magnetic steel, auxiliary magnetic steels, and a magnetic conductive plate. The auxiliary magnetic steels are spaced apart and are respectively disposed on the magnetic steels. The magnetic conductive plate is disposed on the auxiliary magnetic steels. The magnetic conductive plate is integrally formed and covers on the auxiliary magnetic steels. The magnetic gap are formed between the magnetic conductive plate and the magnetic steels.

However, in the sound device of the prior art, the magnetic conductive plate is integrally formed, so that the magnetic gap between the magnetic conductive plate and the magnetic steels is small and limited, which cannot achieve a desire magnetic gap and affects acoustic performance.

Therefore, it is necessary to provide a sound device to solve above technical problems.

SUMMARY

A purpose of the present disclosure is to provide a sound device having excellent acoustic performance.

In order to achieve above purpose, the present disclosure provides the sound device including: a frame, a first vibration system, a magnetic circuit system, and a second vibration system.

The first vibration system includes a first vibrating diaphragm and a first voice coil. The first vibrating diaphragm is fixed to the frame. The first voice coil is configured to drive the first vibrating diaphragm to vibrate and sound.

The magnetic circuit system is fixed to the frame. The magnetic circuit system includes a first magnetic conductive plate, a main magnetic steel, first side magnetic steels, second side magnetic steels, and second magnetic conductive plates. The first magnetic conductive plate includes a magnetic conductive plate body, side plates, and fixing plates. The side plates are bent and respectively extend towards the first vibration system from two opposite sides of the magnetic conductive plate body. The fixing plates are bent and respectively extend from the side plates to the frame. The fixing plates are fixed to the frame. The main magnetic steel is fixed to one side, close to the first vibration system, of the magnetic conductive plate body. The first side magnetic steels are fixed to the frame and are spaced apart. The first side magnetic steels are respectively disposed on a first side and a second side of the main magnetic steel. The two side plates are spaced apart. The two side plates are respectively disposed on a third side and a fourth side of the main magnetic steel. The main magnetic steel, the first side magnetic steels, and the side plates enclose to define a first magnetic gap. The second side magnetic steels are fixed to one side, away from the first vibration system, of the fixing plates. Each of the second side magnetic steels is disposed on one side, away from the main magnetic steel, of a corresponding side plate. The second side magnetic steels are spaced apart. Each of the second magnetic conductive plates is stacked on one side, away from the first vibration system, of each of the first side magnetic steels and/or each of the second side magnetic steels. The second magnetic conductive plates are fixed to the frame. The second magnetic conductive plates are disposed around the magnetic conductive plate body at intervals and the second magnetic conductive plates are enclosed to define a second magnetic gap. The first voice coil is inserted into the first magnetic gap.

The second vibration system includes a second vibrating diaphragm and a second voice coil. The second vibrating diaphragm is fixed to the frame and located on one side, away from the first vibration system, of the magnetic circuit system. The second voice coil drives the second vibrating diaphragm to vibrate and sound. The second voice coil is inserted into the second magnetic gap.

Optionally, the first side magnetic steels are respectively disposed on two opposite long sides of the main magnetic steel at intervals. The second side magnetic steels are respectively disposed on two opposite short sides of the main magnetic steel at intervals.

Optionally, each of the first side magnetic steels includes a first magnetic steel body, a bending portion, and a first extending portion. Each first magnetic steel body is fixed to the frame. Each bending portion extends from one side, close to the main magnetic steel, of a corresponding first magnetic steel body to the first vibration system. Each first extending portion protrudes and extends towards the main magnetic steel from a corresponding bending portion. The first extending portions and the main magnetic steel are spaced apart to form the first magnetic gap.

Optionally, each of the first side magnetic steels includes a second magnetic steel body and a second extending portion. Each second magnetic steel body is fixed to the frame. Each second extending portion extends from a corresponding second magnetic steel body to a position close to the main magnetic steel. One side, close to the first vibration system, of each second extending portion and one side, close to the first vibration system, of each second magnetic steel body are located on a same plane. Second extending portions and the main magnetic steel are spaced apart to form the first magnetic gap.

Optionally, the frame includes a first frame and a second frame. The second frame is stacked on and fixed to the first frame. The first side magnetic steels are located between the first frame and the second frame. The first magnetic conductive plate is fixed to the first frame. The first vibration system is fixed to the first frame. The fixing plates of the first magnetic conductive plate of the magnetic circuit system are fixed to the first frame. The second vibration system is fixed to the second frame.

Optionally, the sound device further includes supporting plates. The supporting plates are respectively fixed to two opposite sides of the first frame. The first side magnetic steels are respectively fixed to the supporting plates.

Optionally, the magnetic circuit system further includes a lower clamping plate. The lower clamping plate is stacked on and fixed to one side, close to the first vibration system, of the main magnetic steel.

Optionally, the magnetic conductive plate body, the side plate, and the fixing plate are integrally formed or independent structures.

Optionally, the sound device further includes an elastic conductive component. The elastic conductive component includes a first elastic conductive component and second elastic conductive components. The first elastic conductive component is fixed to one side, close to the first vibration system, of the first frame. The second elastic conductive components are fixed to one side, close to the second vibration system, of the second frame. The first elastic conductive component and the second elastic conductive components are respectively electrically connected to the first voice coil and the second voice coil.

Optionally, the sound device further includes a front cover. The front cover covers on one side, away from the second vibration system, of the second frame. Sound outlet holes are defined on the front cover and penetrate the front cover. The front cover is spaced apart from the second vibrating diaphragm to form a sound front cavity. The sound front cavity is communicated with outside through the sound outlet holes.

Compared with the prior art, in the sound device of the present disclosure, the magnetic circuit system is fixed to the frame. The magnetic circuit system includes the first magnetic conductive plate, the main magnetic steel, the first side magnetic steels, the second side magnetic steels, and the second magnetic conductive plates. The first magnetic conductive plate includes the magnetic conductive plate body, the side plates, and the fixing plat. The side plates are bent and respectively extend towards the first vibration system from the two opposite sides of the magnetic conductive plate body. The fixing plates are bent and respectively extend from the side plates to the frame. The fixing plates are fixed to the frame. The main magnetic steel is fixed to the one side, close to the first vibration system, of the magnetic conductive plate body. The first side magnetic steels are fixed to the frame and are spaced apart. The first side magnetic steels are respectively disposed on the first side and the second side of the main magnetic steel. The two side plates are spaced apart. The two side plates are respectively disposed on the third side and the fourth side of the main magnetic steel. The main magnetic steel, the first side magnetic steels, and the side plates enclose to define the first magnetic gap. The second side magnetic steels are fixed to the one side, away from the first vibration system, of the fixing plates. Each of the second side magnetic steels is disposed on the one side, away from the main magnetic steel, of a corresponding side plate. The second side magnetic steels are spaced apart. Each of the second magnetic conductive plates is stacked on the one side, away from the first vibration system, of each of the first side magnetic steels and/or each of the second side magnetic steels. The second magnetic conductive plates are fixed to the frame. The second magnetic conductive plates are disposed around the magnetic conductive plate body at intervals and the second magnetic conductive plates are enclosed to define the second magnetic gap. The first voice coil is inserted into the first magnetic gap. The second voice coil is inserted into the second magnetic gap. In this way, a long edge position of the first magnetic conductive plate forms the magnetic conductive plate body, which effectively simplifies structure of the magnetic conductive plate. At the same time, by adjusting distances between the first side magnetic steels and the main magnetic steel, a size of the first magnetic gap is optimized, and the acoustic performance of the sound device is improved.

BRIEF DESCRIPTION OF DRAWINGS

In order to more clearly illustrate technical solutions in embodiments of the present disclosure, drawings required in description of the embodiments are briefly described below. Obviously, the drawings in the following description are merely some embodiments of the present disclosure. For a person of ordinary skill in prior art, other drawings may be obtained according to the drawings without creative efforts.

Figure 1:
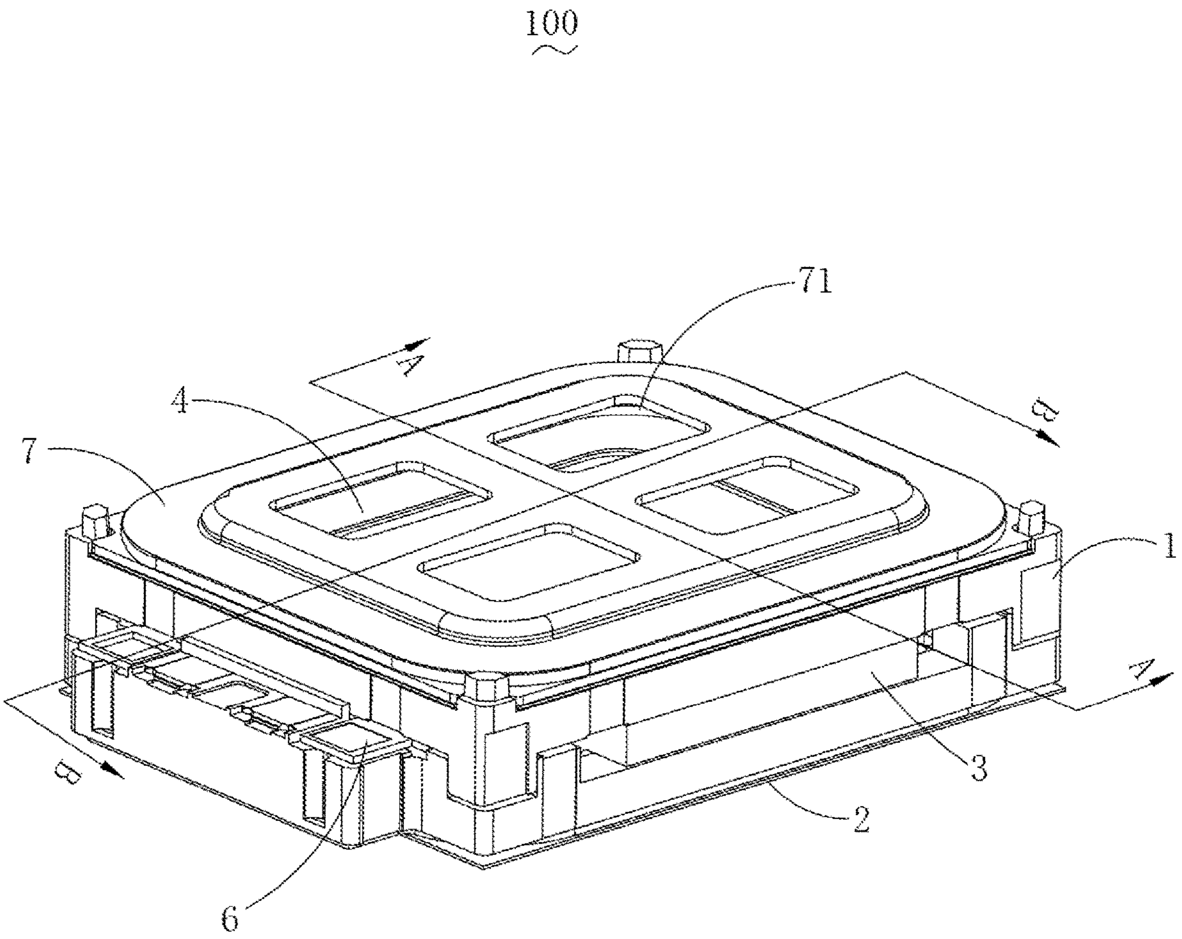
FIG. 1 is a perspective structural schematic diagram of a sound device according to one embodiment of the present disclosure.

Reference number in the drawings: 100. sound device; 1. frame; 11. first frame; 12. second frame; 2. first vibration system; 21. first vibrating diaphragm; 211. first fixing portion; 212. first bending ring portion; 213. first connecting portion; 214. first dome; 22. first voice coil; 3. vibration system; 31. main magnetic steel; 32. first side magnetic steels; 321. first magnetic steel body; 322. bending portion; 323. first extending portion; 324. second magnetic steel body; 325. second extending portion; 33. second side magnetic steel; 34. first magnetic conductive plate; 341. magnetic conductive plate body; 342. side plate; 343. fixing plate; 35. second magnetic conductive plate; 36. first magnetic gap; 37. second magnetic gap; 38. lower clamping plate; 4. second vibration system; 41. second vibrating diaphragm; 411. second fixing portion; 412. second bending ring portion; 413. second connecting portion; 414. second dome; 42. second voice coil; 5. supporting plate; 6. elastic conductive component; 61. first elastic conductive component; 62. second elastic conductive components; 7. front cover; 71. sound outlet holes; 72. sound front cavity.

DETAILED DESCRIPTION

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in prior art without creative efforts shall fall within a protection scope of the present disclosure.

Figure 2:
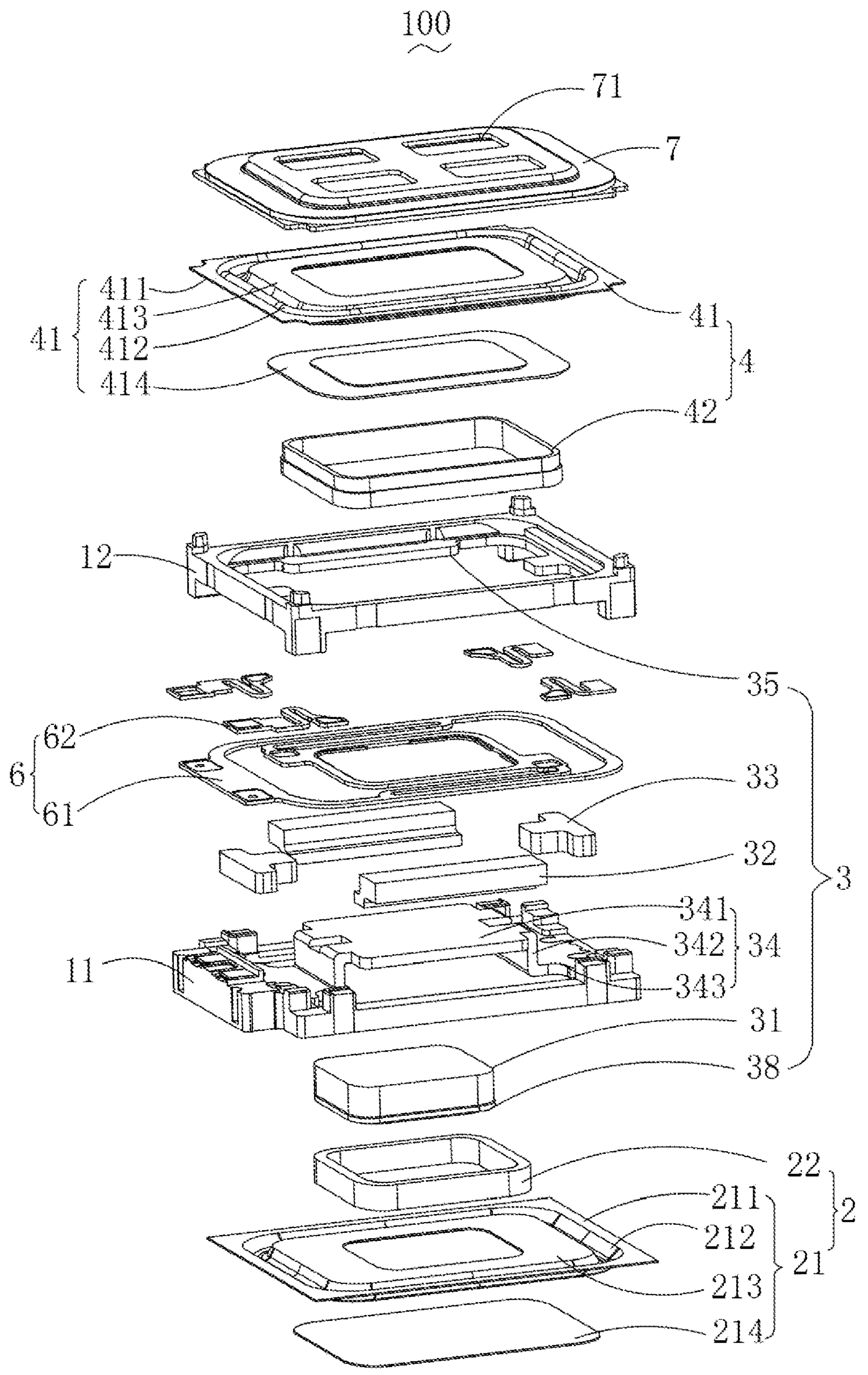
FIG. 2 is an exploded perspective structural schematic diagram of the sound device shown in FIG. 1.
Figure 3:
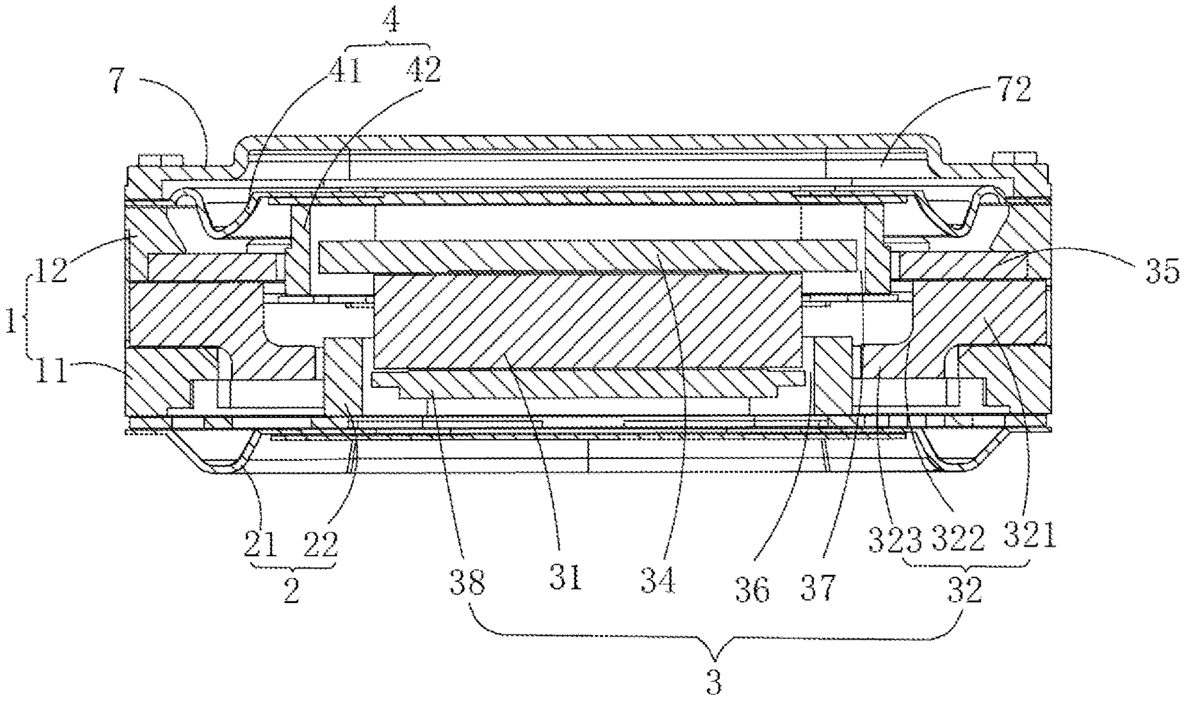
FIG. 3 is a cross-sectional schematic diagram taken along the line A-A shown in FIG. 1.
Figure 4:
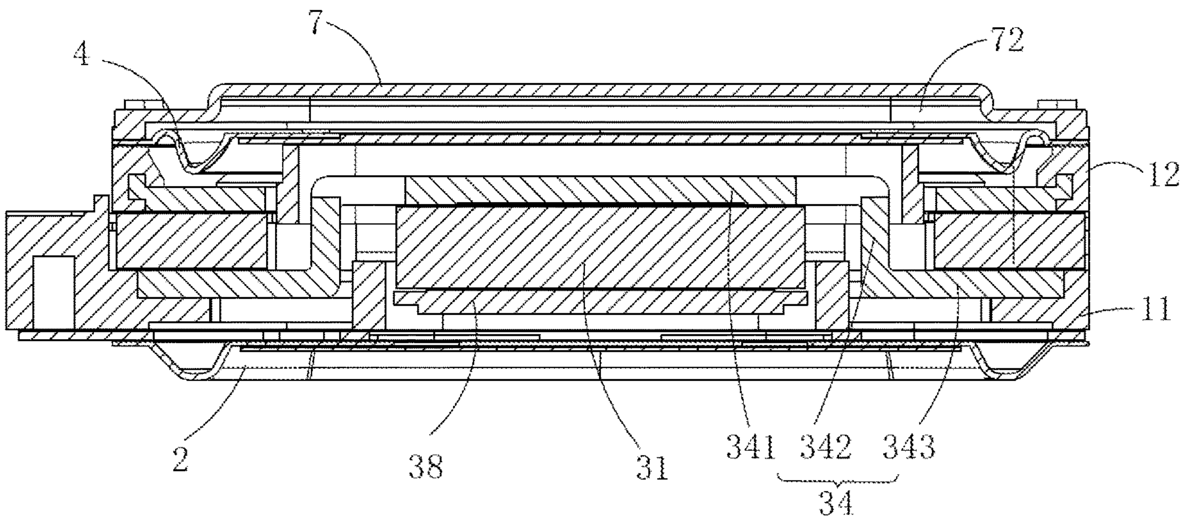
FIG. 4 is a cross-sectional schematic diagram taken along the line B-B shown in FIG. 1.
Figure 5:
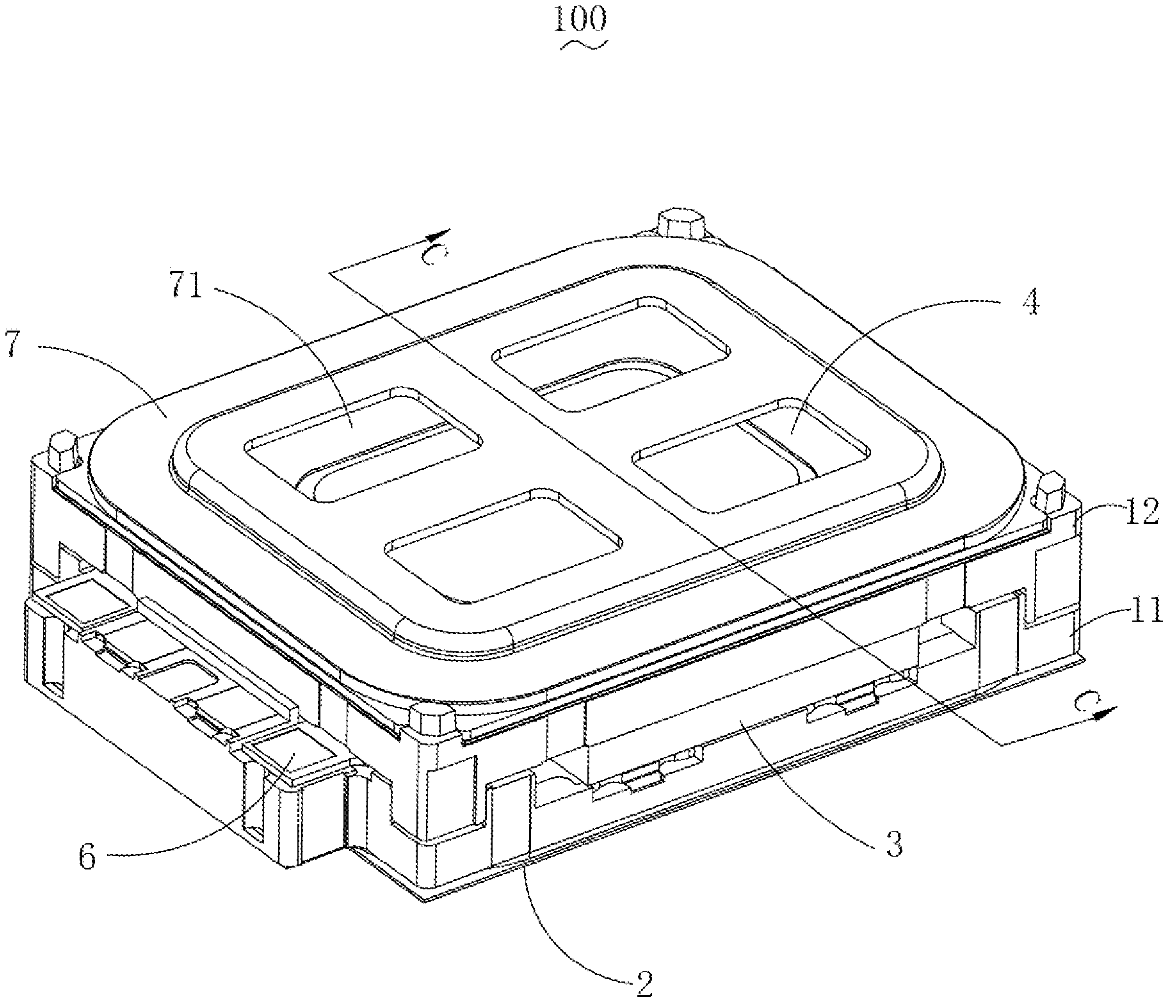
FIG. 5 is a perspective structural schematic diagram of a sound device according to one embodiment of the present disclosure.
Figure 6:
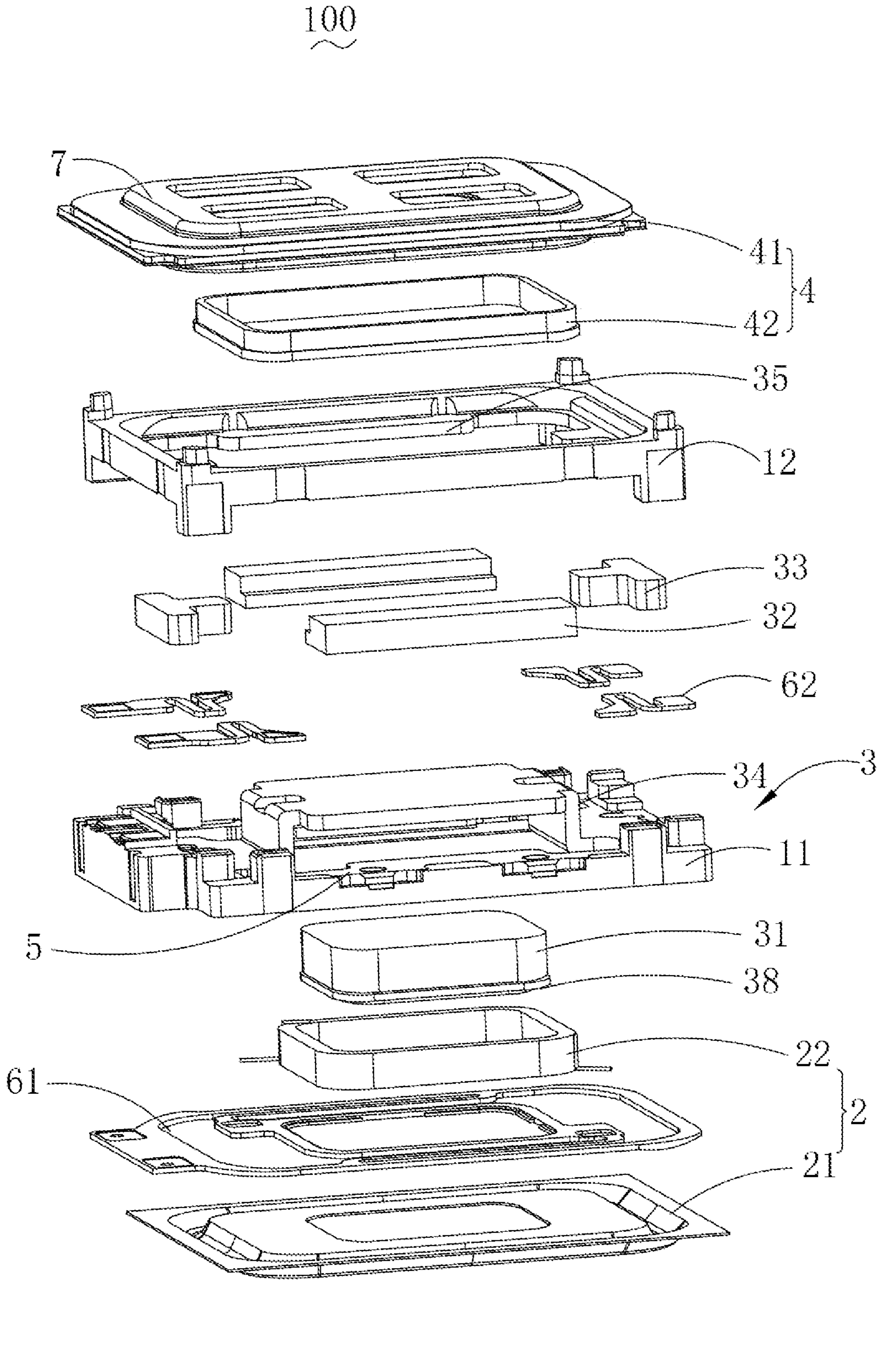
FIG. 6 is an exploded perspective structural schematic diagram of the sound device shown in FIG. 5.
Figure 7:
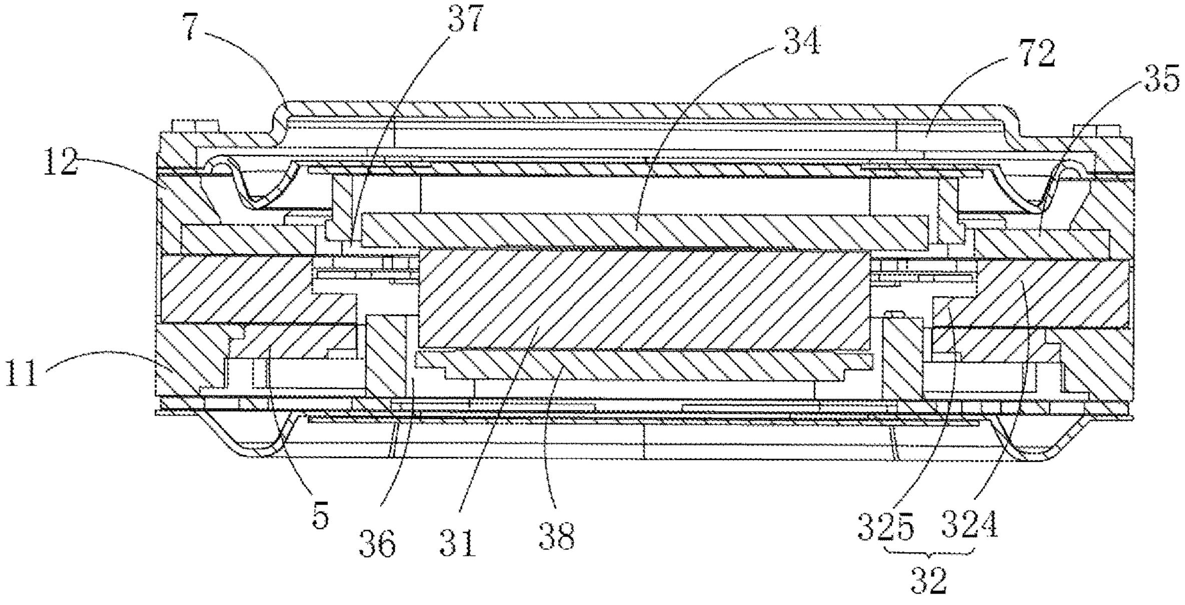
FIG. 7 is a cross-sectional schematic diagram taken along the line C-C shown in FIG. 5.
Figure 8:
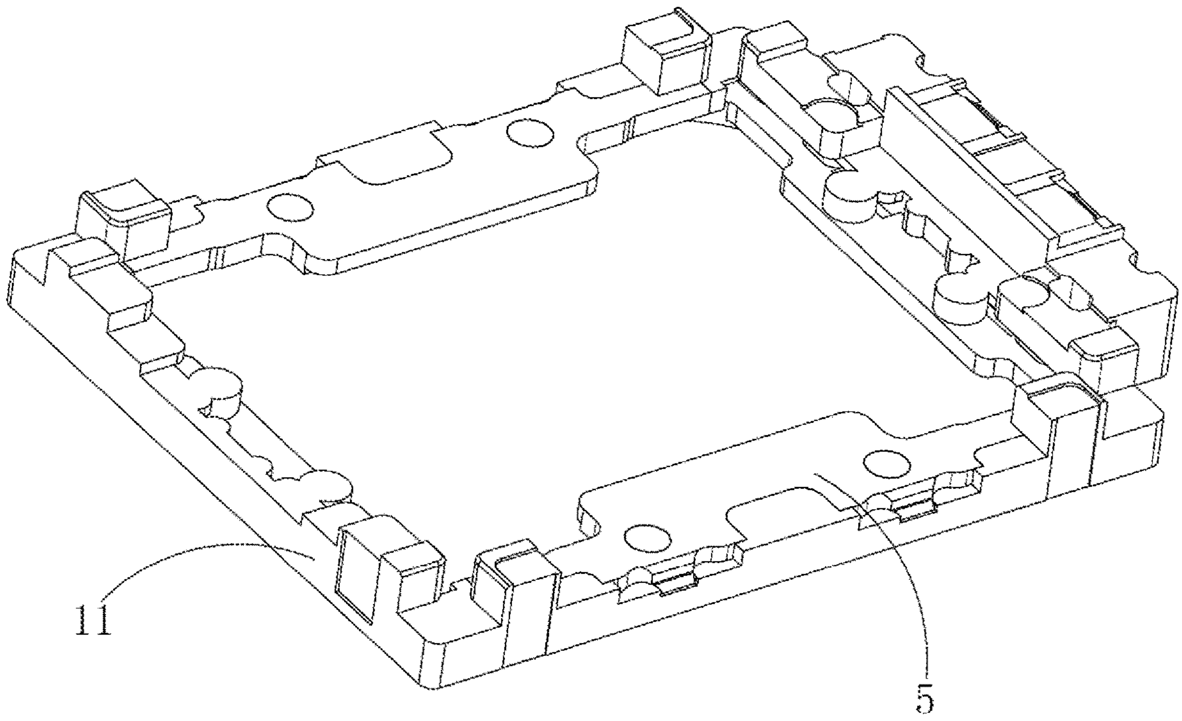
FIG. 8 is a structural schematic diagram of supporting plates and a first frame of FIG. 5 shown in a use state.

Referring to FIGS. 1-8, the present disclosure provides a sound device 100, including: a frame 1, a first vibration system 2, a magnetic circuit system 3, and a second vibration system 4.

The first vibration system 2, the second vibration system 4, and the magnetic circuit system 3 are disposed and fixed on the frame 1, so that the first vibration system 2 and the second vibration system 4 are good in stability during vibration and sound production.

The first vibration system 2 includes a first vibrating diaphragm 21 and a first voice coil 22. The first vibrating diaphragm 21 is fixed to the frame 1. The first voice coil 22 is configured to drive the first vibrating diaphragm 21 to vibrate and sound.

The first vibrating diaphragm 21 includes a first fixing portion 211, a first bending ring portion 212, and a first connecting portion 213. The first bending ring portion 212 is bent and extends from an inner periphery of the first fixing portion 211. The first connecting portion 213 extends from the first bending ring portion 212 along a direction away from the frame 1. The first voice coil 22 is fixed to one side, close to the magnetic circuit system 3, of the first fixing portion 211. In the embodiment, a first dome 214 is fixed to one side, away from the magnetic circuit system 3, of the first connecting portion 213, and the first dome 214 is configured to improve vibration performance of the first connecting portion 213.

The magnetic circuit system 3 is fixed to the frame 1. The magnetic circuit system 3 includes a first magnetic conductive plate 34, a main magnetic steel 31, first side magnetic steels 32, second side magnetic steels 33, and second magnetic conductive plates 35. The first magnetic conductive plate 34 includes a magnetic conductive plate body 341, side plates 342, and fixing plats 343. The side plates 342 are bent and respectively extend towards the first vibration system 2 from two opposite sides of the magnetic conductive plate body 341. The fixing plates 343 are bent and respectively extend from the side plates 342 to the frame 1. The fixing plates 343 are fixed to the frame 1. The main magnetic steel 31 is fixed to one side, close to the first vibration system 2, of the magnetic conductive plate body 341. The first side magnetic steels 32 are fixed to the frame 1 and are spaced apart. The first side magnetic steels 32 are respectively disposed on a first side and a second side of the main magnetic steel 31. The two side plates 342 are spaced apart. The two side plates 342 are respectively disposed on a third side and a fourth side of the main magnetic steel 31. The main magnetic steel 31, the first side magnetic steels 32, and the side plates 342 enclose to define a first magnetic gap 36. The second side magnetic steels 33 are fixed to one side, away from the first vibration system 2, of the fixing plates 343. Each of the second side magnetic steels 33 is disposed on one side, away from the main magnetic steel 31, of a corresponding side plate 342. The second side magnetic steels 33 are spaced apart. Each of the second magnetic conductive plates 35 is stacked on one side, away from the first vibration system 2, of each of the first side magnetic steels 32 and/or each of the second side magnetic steels 33. The second magnetic conductive plates 35 are fixed to the frame 1. The second magnetic conductive plates 35 are disposed around the magnetic conductive plate body 341 at intervals. The second magnetic conductive plates 35 are enclosed to define a second magnetic gap 37. The first voice coil 22 is inserted into the first magnetic gap 36. In this way, a long edge position of the first magnetic conductive plate 34 forms the magnetic conductive plate body 341, which effectively simplifies a structure of the magnetic conductive plate. At the same time, by adjusting a distance between the first side magnetic steels 32 and the main magnetic steel 31 to increase the first magnetic gap 36, a size of the first magnetic gap is optimized, and the acoustic performance of the sound device 100 is improved.

The second vibration system 4 includes a second vibrating diaphragm 41 and a second voice coil 42. The second vibrating diaphragm 41 is fixed to one side, away from the magnetic circuit system 3, of the frame 1. The second voice coil 42 drives the second vibrating diaphragm 41 to vibrate and sound. The second voice coil 42 is inserted into the second magnetic gap 37.

The second vibrating diaphragm 41 includes a second fixing portion 411, a second bending ring portion 412, and a second connecting portion 413. The second bending ring portion 412 is bent and extends from a periphery of the second fixing portion 411. The second connecting portion 413 extends from the second bending ring portion 412 along a direction of the frame 1. The second voice coil 42 is fixed to one side, close to the magnetic circuit system 3, of the second fixing portion 411. In the embodiment, a second dome 414 is fixed to one side, close to the magnetic circuit system 3, of the second fixing portion 411, and the second dome 414 is configured to improve the vibration performance of the second fixing portion 411. The second voice coil 42 is suspended and fixed to one side, close to the magnetic circuit system 3, of the second dome 414.

In the embodiment, the first side magnetic steels 32 are spaced apart and are respectively disposed on two opposite long sides of the main magnetic steel 31 at intervals. The second side magnetic steels 33 are spaced apart and are respectively disposed on two opposite short sides of the main magnetic steel 31. The first side magnetic steels 32 are special-shaped magnetic steels, and the long sides of the main magnetic steel 31 are matched with the special-shaped magnetic steels, so that the magnetic gap is freely adjusted, the size of the first magnetic gap is optimized, and the acoustic performance of the sound device 100 is improved.

In the embodiment, each of the first side magnetic steels 32 includes a first magnetic steel body 321, a bending portion 332, and a first extending portion 323. Each first magnetic steel body 321 is fixed to the frame 1. Each bending portion 322 extends from one side, close to the main magnetic steel 31, of a corresponding first magnetic steel body 321 to the first vibration system 2. Each first extending portion 323 protrudes and extends towards the main magnetic steel 31 from a corresponding bending portion 322. First extending portions 323 and the main magnetic steel 31 are spaced apart to form the first magnetic gap 36. The first magnetic gap 36 defined by the first extending portions 323 and the main magnetic steel 31 is adjusted through adjusting positions of the first magnetic steel bodies 321 and a position of the frame 1, which optimizes the size of the first magnetic gap 36, and effectively improves the acoustic performance of the sound device 100.

In the embodiment, each of the first side magnetic steels 32 includes a second magnetic steel body 324 and a second extending portion 325. Each second magnetic steel body 324 is fixed to the frame 1. Each second extending portion 325 extends from a corresponding second magnetic steel body 324 to a position close to the main magnetic steel 31. One side, close to the first vibration system 2, of each second extending portion 325 and one side, close to the first vibration system 2, of each second magnetic steel body 234 are located on a same plane. Second extending portions 325 and the main magnetic steel 31 are spaced apart to form the first magnetic gap 36.

In the embodiment, the frame 1 includes a first frame 11 and a second frame 12. The second frame 12 is stacked on and fixed to the first frame 11. The first side magnetic steels 32 are located between the first frame 11 and the second frame 12. The first magnetic conductive plate 34 is fixed to the first frame 11. In this way, the positions of the first side magnetic steels 32 is conveniently adjusted to adjust the size of the first magnetic gap 36, which improves the acoustic performance of the sound device 100. The first vibration system 2 is fixed to the first frame 11. The fixing plates 343 of the first magnetic conductive plate 34 of the magnetic circuit system 3 are fixed to the first frame 11. The second vibration system 4 is fixed to the second frame 12, so that the first vibration system 2, the second vibration system 4, and the magnetic circuit system 3 are well fixed.

An outer periphery of the first vibrating diaphragm 21 of the first vibration system 2 is fixed to the first frame 11. An outer periphery of the second vibrating diaphragm 41 of the second vibration system 4 is fixed to the second frame 12. The fixing plates 343 of the magnetic circuit system 3 are fixed to the first frame 11.

In an alternative embodiment of the present disclosure, the sound device 100 further includes supporting plates 5. The supporting plates 5 are close to the second frame 12 and are respectively fixed to two opposite sides of the first frame 11. The first side magnetic steels 32 are respectively fixed to the supporting plates 5. The supporting plates 5 independently disposed on the long sides of the main magnetic steel 31 are configured to support the first side magnetic steels 32, so that the positions of the first side magnetic steels 32 are convenient to adjust, and the supporting plates 5 are matched with the first side magnetic steels 32, making assembly convenient and allowing a free adjustment of the first magnetic gap. A lower end surface of the second extending portions 325 is parallel to the second magnetic steel bodies 324. The first side magnetic steels 32 is installed on the first frame 11 to facilitate the assembly of the first side magnetic steels 32.

Optionally, the supporting plates 5 is configured as a magnetic conductive plate or a pole core fixing the first side magnetic steels 32, which enhances magnetic performance of the first side magnetic steels 32.

In the embodiment, the magnetic circuit system 3 further includes a lower clamping plate 38. The lower clamping plate 38 is stacked on and fixed to one side, close to the first vibration system 2, of the main magnetic steel 31. The lower clamping plate 38 is configured to improve the magnetic performance of the magnetic circuit system 3.

Optionally, the lower clamping plate 38 is configured as the magnetic conductive plate or the pole core fixed to the main magnetic steel, which enhances the magnetic performance of the main magnetic steel 31.

In the embodiment, the magnetic conductive plate body 341, the side plate 342, and the fixing plate 343 are integrally formed or independent structures, which simplifies a structure of the first magnetic conductive plate 34, optimizes a design of the second magnetic gap, and improves the acoustic performance of the sound device 100.

Optionally, the second side magnetic steels 33 and the first magnetic conductive plate 34 are fixed through welding, and of course, a fixing method of the second side magnetic steels 33 and the first magnetic conductive plate 34 is not limited to welding, and may further be riveting, gluing, etc., which is specifically selected according to actual needs, and is not described herein.

In the embodiment, the sound device 100 further includes an elastic conductive component 6. The elastic conductive component 6 includes a first elastic conductive component 61 and second elastic conductive components 62. The first elastic conductive component 61 is fixed to one side, close to the first vibration system 2, of the first frame 11. The second elastic conductive components 62 are fixed to one side, close to the second vibration system 4, of the second frame 12. The first elastic conductive component 61 and the second elastic conductive components 62 are respectively electrically connected to the first voice coil 22 and the second voice coil 42. One end of the elastic conductive component 6 is configured to connect to an external circuit, and the first elastic conductive component 61 and the second elastic conductive components 62 are respectively connected to the first voice coil 22 and the second voice coil 42. The first elastic conductive component 61 and the second elastic conductive components 62 respectively provide power for the first voice coil 22 and the second voice coil 42, and respectively make the first voice coil 22 and the second voice coil 42 to vibrate and sound. In the present embodiment, four second elastic conductive components 62 are provided, and each two of the four second elastic conductive components 62 are spaced apart and are respectively disposed on two opposite sides of a corresponding second side magnetic steel 33. A first end of each of the second elastic conductive components 62 is fixed to the frame 1, and a second end of each of the second elastic conductive components 62 is connected to the second voice coil 42. The second elastic conductive components 62 are elastic arm structures.

In the embodiment, the sound device 100 further includes a front cover 7. The front cover 7 covers on one side, away from the second vibration system 4, of the second frame 12. Sound outlet holes 71 are defined on the front cover 7 and penetrate the front cover 7. The front cover 7 is spaced apart from the second vibrating diaphragm 41 to form a sound front cavity 72. The sound front cavity 72 is communicated with outside through the sound outlet holes 71. The front cover 7 covers the second vibration system, so that fixing effect of the second vibrating diaphragm 41 and the second frame 12 is good. Sound of the first vibration system 2 and the second vibration system 4 diffuses from the sound outlet holes 71 to external environment, which is good in sound effect. The sound outlet holes 71 are uniformly distributed on the front cover 7, so that sound outlet effect is uniform.

Compared with the prior art, in the sound device of the present disclosure, the magnetic circuit system is fixed to the frame. The magnetic circuit system includes the first magnetic conductive plate, the main magnetic steel, the first side magnetic steels, the second side magnetic steels, and the second magnetic conductive plates. The first magnetic conductive plate includes the magnetic conductive plate body, the side plates, and the fixing plat. The side plates are bent and extend towards the first vibration system from the two opposite sides of the magnetic conductive plate body. The fixing plates are bent and respectively extend from the side plates to the frame. The fixing plates are fixed to the frame. The main magnetic steel is fixed to the one side, close to the first vibration system, of the magnetic conductive plate body. The first side magnetic steels are fixed to the frame and are spaced apart. The first side magnetic steels are respectively disposed on the first side and the second side of the main magnetic steel. The two side plates are spaced apart. The two side plates are respectively disposed on the third side and the fourth side of the main magnetic steel. The main magnetic steel, the first side magnetic steels, and the side plates are enclosed to define the first magnetic gap. The second side magnetic steels are fixed to the one side, away from the first vibration system, of the fixing plates. Each of the second side magnetic steels is disposed on the one side, away from the main magnetic steel, of the corresponding side plate. The second side magnetic steels are spaced apart. Each of the second magnetic conductive plates is stacked on the one side, away from the first vibration system, of each of the first side magnetic steels and/or each of the second side magnetic steels. The second magnetic conductive plates are fixed to the frame. The second magnetic conductive plates are disposed around the magnetic conductive plate body at intervals and the second magnetic conductive plates are enclosed to define the second magnetic gap. The first voice coil is inserted into the first magnetic gap. The second voice coil is inserted into the second magnetic gap. In this way, the long edge position of the first magnetic conductive plate form the magnetic conductive plate body, which effectively simplifies the structure of the magnetic conductive plate. At the same time, by adjusting the distance between the first side magnetic steels and the main magnetic steel, the size of the first magnetic gap is optimized, and the acoustic performance of the sound device is improved.

The above are only the embodiments of the present disclosure. It should be noted that, for the person of ordinary skill in the prior art, improvements are made without departing from concepts of the present disclosure, but these improvements are all within the protection scope of the present disclosure.

What is claimed is:

1. A sound device, comprising:

a frame;

a first vibration system;

an asymmetric magnetic circuit system;

a second vibration system; and a front cover;

wherein the frame comprises a first frame and a second frame, the second frame is stacked on and fixed to the first frame;

the first vibration system comprises a first vibrating diaphragm and a first voice coil, the first vibrating diaphragm is fixed to the first frame, and the first voice coil is configured to drive the first vibrating diaphragm to vibrate and sound;

the asymmetric magnetic circuit system is fixed to the frame, the asymmetric magnetic circuit system comprises a first magnetic conductive plate, a main magnetic steel, first side magnetic steels, second side magnetic steels, and second magnetic conductive plates; the second magnetic conductive plates are independent of the first magnetic conductive plate to adjust a magnetic gap between them; the first magnetic conductive plate is fixed to the first frame, the first magnetic conductive plate comprises a magnetic conductive plate body, side plates, and fixing plates; the side plates are bent and respectively extend towards the first vibration system from two opposite sides of the magnetic conductive plate body, the fixing plates are bent and respectively extend from the side plates to the first frame, the fixing plates are directly fixed to the first frame; the main magnetic steel is fixed to one side, close to the first vibration system, of the magnetic conductive plate body; the first side magnetic steels are fixed to the frame and are located between the first frame and the second frame and are spaced apart; the first side magnetic steels are respectively disposed on a first side and a second side of the main magnetic steel, the two side plates are spaced apart, the two side plates are respectively disposed on a third side and a fourth side of the main magnetic steel; the main magnetic steel, the first side magnetic steels, and the side plates enclose to define a first magnetic gap; the second side magnetic steels are fixed to one side, away from the first vibration system, of the fixing plates; each of the second side magnetic steels is disposed on one side, away from the main magnetic steel, of a corresponding side plate; the second side magnetic steels are spaced apart; each of the second magnetic conductive plates is stacked on one side, away from the first vibration system, of each of the first side magnetic steels and/or each of the second side magnetic steels; the second magnetic conductive plates are directly fixed to the second frame, the second magnetic conductive plates are disposed around the magnetic conductive plate body of the first magnetic conductive plate at intervals to form a second magnetic gap between them; and the first voice coil is inserted into the first magnetic gap; and the second vibration system comprises a second vibrating diaphragm and a second voice coil, the second vibrating diaphragm is fixed to the second frame and located on one side, away from the first vibration system, of the asymmetric magnetic circuit system; the second voice coil drives the second vibrating diaphragm to vibrate and sound, and the second voice coil is inserted into the second magnetic gap;

the front cover covers on one side, away from the second vibration system, of the second frame for forming a housing.

2. The sound device according to claim 1, wherein the first side magnetic steels are respectively disposed on two opposite long sides of the main magnetic steel at intervals, and the second side magnetic steels are respectively disposed on two opposite short sides of the main magnetic steel at intervals.

3. The sound device according to claim 1, wherein each of the first side magnetic steels comprises a first magnetic steel body, a bending portion, and a first extending portion; each first magnetic steel body is fixed to the frame, each bending portion extends from one side, close to the main magnetic steel, of a corresponding first magnetic steel body to the first vibration system; each first extending portion protrudes and extends towards the main magnetic steel from a corresponding bending portion, and first extending portions and the main magnetic steel are spaced apart to form the first magnetic gap.

4. The sound device according to claim 1, wherein each of the first side magnetic steels comprises a second magnetic steel body and a second extending portion, each second magnetic steel body is fixed to the frame, each second extending portion extends from a corresponding second magnetic steel body to a position close to the main magnetic steel; one side, close to the first vibration system, of each second extending portion and one side, close to the first vibration system, of each second magnetic steel body are located on a same plane, and second extending portions and the main magnetic steel are spaced apart to form the first magnetic gap.

5. The sound device according to claim 1, wherein the sound device further comprises supporting plates, the supporting plates are respectively fixed to two opposite sides of the first frame, and the first side magnetic steels are respectively fixed to the supporting plates.

6. The sound device according to claim 1, wherein the asymmetric magnetic circuit system further comprises a lower clamping plate, and the lower clamping plate is stacked on and fixed to one side, close to the first vibration system, of the main magnetic steel.

7. The sound device according to claim 1, wherein the magnetic conductive plate body, the side plate, and the fixing plate are integrally formed or independent structures.

8. The sound device according to claim 1, wherein the sound device further comprises an elastic conductive component, the elastic conductive component comprises a first elastic conductive component and second elastic conductive components, the first elastic conductive component is fixed to one side, close to the first vibration system, of the first frame; the second elastic conductive components are fixed to one side, close to the second vibration system, of the second frame; and the first elastic conductive component and the second elastic conductive components are respectively electrically connected to the first voice coil and the second voice coil.

9. The sound device according to claim 1, wherein sound outlet holes are defined on the front cover and penetrate the front cover, the front cover is spaced apart from the second vibrating diaphragm to form a sound front cavity, and the sound front cavity is communicated with outside through the sound outlet holes.

* * * * *